BIDIRECTIONAL SWITCH FOR MULTIPLE CIRCUIT CONTROL

Filed Aug. 30, 1966 2 Sheets-Sheet 1

INVENTORS R. M. GENKE
P. A. HARDING
M. W. ROLUND
BY Charles Scott Phelan
ATTORNEY 3,492,651

BIDIRECTIONAL SWITCH FOR MULTIPLE CIRCUIT CONTROL

Richard M. Genke, Colts Neck, N.J., Philip A. Harding, Aurora, Ill., and Michael W. Rolund, Eatontown, N.J., assignors to Bell Telephone Laboratories, Incorporated, a corporation of New York Filed Aug. 30, 1966, Ser. No. 576,056
Int. Cl. H04q *1/00, 3/00*
U.S. Cl. 340—166 20 Claims

ABSTRACT OF THE DISCLOSURE

A multilateral bridge gate is arranged to respond to bias current by making simultaneously available to a plurality of open circuits, through a respective plurality of diode bridge branches, a common return circuit closure through a bridge branch circuit. A transistor switch circuit is transformer-coupled to a supply gate bias to a plurality of the gates in a current control circuit without also handling the current from the open circuits of any of the gates served. Plural current control circuits of the type described are arranged in matrix fashion to be selectively actuated.

This invention relates to a bidirectional switch for providing a circuit closure simultaneously to a plurality of open circuits. The invention is described herein with reference to its application to a magnetic memory system although other applications of the switch are, of course, possible.

In certain circuit arrangements it is necessary to actuate similar connections in a plurality of circuits at one time. However, the cost of an appropriate number of separate switches for this purpose is comparatively high and becomes increasing burdensome as the number of open circuits to be controlled increases. Furthermore, if the number of circuits to be controlled are multipled to a single switch for achieving a simultaneous closure, the total current that must be handled may easily exceed the current handling capability of the switch. This latter factor is of particular importance if it is desired to achieve electronic control by employing a transistor switch.

It is further well known that when circuits are coupled together for multiple operation problems of cross talk among the coupled circuits and among associated circuits often arise. These various areas of potential difficulty, which often become of importance when one seeks to achieve low cost simultaneous actuation of plural circuit closures, are made more intense wen it is necessary that the circuit closure accommodate bidirectional currents from the circuits involved.

It is, therefore, one object of the invention to improve arrangements for simultaneously switching a plurality of circuits.

It is another object to reduce the cost of switching multiple circuits at the same time as compared to the cost for individually and simultaneously controlling each of the circuits.

A further object is to minimize interference among circuits that are coupled together for cooperative operation.

These and other objects of the invention are realized in an illustrative embodiment wherein a multilateral bridge type of gate is arranged to respond to bias current by making available to a plurality of open circuits a common return circuit closure. A transistor switch circuit is coupled to the gate for providing the necessary gate bias current.

It is one feature of the invention that the open circuits associated with the multilateral bridge are so related that certain of the open circuits can provide return circuits connections for other of the circuits and thereby reduce the net current in a common return circuit path associated with the bridge. This reduction in maximum common return path current correspondingly reduces the maximum bias current required for operation of the bridge.

Another feature is that a single-transistor switching circuit can accommodate a multilateral bridge arrangement wherein the maximum number of open circuits served is limited by the current handling capacity of the transistor circuit, and the maximum number of bridge gate arrays served is limited by the voltage rating of transistors in the switching circuit.

Still another feature of the invention is that the multilateral bridge is a diode bridge and includes only passive bridge circuit arms.

An additional feature is that in one embodiment of the invention the open circuits include current sources which are differently poled with respect to their connections to corresponding bridge terminals so that at least one of the circuits provides a return current path through the bridge closure for another one of the circuits.

Yet another feature is that an inductive coupling is provided for supplying bias current and is also included in the circuit closure provided to any of the circuits served but its inductance does not add to the inductances of those served circuits.

A further feature is that the use of a bridge type of gate causes the served circuits to see only the impedance of the bridge so that circuits supplying bias to the bridge are, in one embodiment, advantageously remotely located without introducing coupling lead inductance in series with any of the served circuits.

Still another feature is that the circuits served by the bridge gate are advantageously low impedance circuits and the addition of asymmetrically conducting impedance in series with the bridge bias supply increases the breakdown threshold of the gate to spurious noise signals.

A further feature is that utilization of the invention in connection with bridge gates having a large number of arms reduces the influence of any noise leakage into the associated served circuits as compared to arrangements utilizing bridge gates with smaller numbers of arms and served circuits.

A more complete understanding of the present invention, and its various objects and features, may be obtained from a consideration of the following detailed description and the appended claims when taken in connection with the attached drawings in which:

Figure 1:
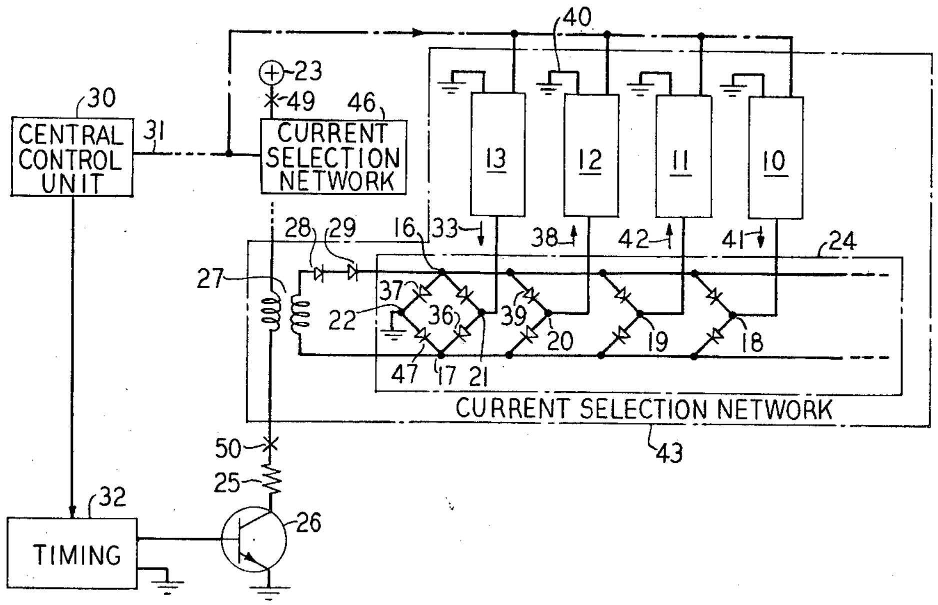
FIG. 1 is a diagram, partially in block and line form and partially in schematic circuit form, illustrating a centrally controlled system employing the concepts of the present invention.

In the centrally controlled system of FIG. 1, it is assumed that it is necessary to provide simultaneous circuit closures for a plurality of open circuits 10, 11, 12, and 13. These circuits are said to be open circuits because, in the illustrated form, each has a ground connection at the upper end thereof and has available to the lower end thereof a ground connection through a multilateral diode bridge gate 24 which provides circuit closure to ground only when appropriately biased as hereinafter described. Other open circuits can also be served by the diode bridge, but only four are needed to illustrate the principles of the present invention.

Assume an illustrative application of the invention to a centrally controlled memory system. Each of the open circuits 10–13 advantageously includes a magnetic memory bit drive circuit and an associated bit driver as will be further described in connection with FIG. 3. Further details of one memory with which the invention is advantageously employed are contained in the copending application Ser. No. 576,042 of R. M. Genke and P. A. Harding entitled "Wiring Configuration for 2-Wire Coincident Current Magnetic Memory" and which was filed concurrently herewith. However, such details comprise no part of the present invention.

The bridge gate 24 includes *n* asymmetrically conductive branch circuits connected between a first terminal 16 and a second terminal 17. Each of the branches includes a pair of diodes connected in series and poled for conduction in the same direction in their respective series circuits between the terminal 16 and 17. The various branch circuits each include an intermediate terminal in its respective series circuit between its diodes. In the circuit of FIG. 1 the bridge gate includes five branches with the branch intermediate terminals 18, 19, 20, 21, and 22. Thus, the branch has $n=5$ asymmetrically conducting branches and it serves $n-1=4$ open circuits 10 through 13.

The circuits 10 through 13 are individually connected to the intermediate terminals 18 through 21, respectively; and the *n*th intermediate terminal, i.e., terminal 22, is connected to ground. As long as the bridge diodes are in a nonconducting condition, none of the circuits 10 through 13 has a current return path. However, a source 23, which is connected across the collector and emitter electrodes of a transistor 26, supplies current for biasing the bridge diodes into conduction. Source 23 is schematically represented by a circled plus sign to indicate any suitable operating energy source having its positive terminal connected in the circuit at the location of the circled plus sign and having its negative terminal connected to ground. Current from source 23 is inductively coupled to the diode bridge through a transformer 27 in response to conduction in transistor 26.

Transformer 27 advantageously employs a one-to-one winding turns ratio. The secondary winding of transformer 27 is connected through a pair of diodes 28 and 29 to the terminals 16 and 17 for supplying bias current to all of the bridge diodes in their forward conducting direction. The diodes 28 and 29 are advantageously included in series with the transformer winding to increase the resistance of the bridge to break down in response to noise from the open circuits 10 through 13 in the absence of conducting bias for the bridge.

Operation of the circuit of FIG. 1 is initiated when a central control unit 30 of the illustrated centrally controlled memory system actuates the open circuits 10 through 13 is response to signals applied via a cable 31. Such signals in a magnetic memory include timing signals during a reading portion of the memory cycle and timing plus data signals during a writing portion of the memory cycle. However, no circuit closures are provided for the open circuits 10 through 13 until the unit 30 actuates a timing signal source 32 which provides a conducting bias signal between the base and emitter electrodes of transistor 26 to initiate conduction of current from the source 23 through the transistor, a current limiting resistor 25, and the transformer 27. Current flow in the last mentioned circuit causes current to flow in the secondary winding of transformer 27 with a polarity appropriate for forward biasing the diodes 28 and 29 as well as all of the diodes in the multilateral bridge gate 24. In an application of the circuit of FIG. 1 to a magnetic memory, transformer 27 is appropriately designed to provide such bias current in the form of a current pulse persisting continuously during both the reading and writing intervals of a memory cycle. This bias current is necessary to establish a conduction level in all of the diodes of the bridge so that any variation in the amplitudes of output signals from the circuits 10 through 13 will not cause the bridge gate to operate as an amplitude selector and provide a ground closure to only that circuit providing the largest output signal. The inductive kick on turn-off of the bias current restores the transformer after each memory cycle and thus prevents the build up of magnetic bias.

Consider first that only the circuit 13 is activated by signals from cable 31 during a conduction interval of transistor 26 in the bias current switching circuit. Circuit 13 supplies a positive-going signal in the direction of an arrow 33. Such current flows through the intermediate terminal 21, a diode 36, terminal 17, the secondary winding of transformer 27, diodes 28 and 29, the terminal 16, a diode 37, terminal 22, and ground. If a second open circuit 12 is activated at the same time to provide a current of opposite polarity with respect to its corresponding bridge terminal 20, as indicated by an arrow 38 in the drawing, the two circuits 12 and 13 provide return current paths for one another through the circuit closure provided by the bridge, but without causing any significant current to flow in the common ground return at bridge terminal 22. In this latter case the return current path for the circuit 13 is similar to that previously listed except that from the terminal 16 the principal current flows through a diode 39, the intermediate terminal 20, the circuit 12, and a ground connection 40 to return to the circuit 13. This same loop, of course, causes the circuit 13 to be included in the return current path for the circuit 12.

Since the current sources of the circuits 12 and 13 are in series-aiding relationship in the described loop, although oppositely poled with respect to bridge 24, the total current flowing corresponds to that of only one of these circuits. Furthermore in this situation, with only the circuits 12 and 13 providing current and these currents being of opposite polarity, the only current flowing in the common ground return through terminal 22 is current resulting from a lack of perfect voltage or impedance balance between the circuits 12 and 13. In a magnetic memory application there are three principal sources of such unbalance; but all of them together, or any of them individually, under worst case conditions do not cause substantial common return path current as compared to the main loop current flowing in both of the circuits 12 and 13. For example, some unbalanced current may result from different inductances in the individual circuits 12 and 13 as a result of different information contained in the memory locations linked by their respective circuits. Further unbalance may result from different shuttle noise voltages induced in magnetic memory devices linked to the respective circuits 12 and 13. Additional unbalance current may result from small differences in the resistances of the circuits 12 and 13 between ground and their respective bridge terminals 20 and 21. The total unbalance current will typically be less than 10 percent of the total loop current.

If additional ones of the open circuits are activated, along with one or more of the circuits 12 and 13, varying amounts of unbalance current flow in the common ground path depending upon the polarities of the currents applied by the respective circuits 10 through 13 and upon the individual unbalancing factors hereinbefore noted. Half of the circuits served by a multilateral bridge array are advantageously arranged to provide currents of one polarity and half of the opposite polarity with respect to their respective bridge branch intermediate terminals so that when all of such open circuits are activated each provides a return current path for another through the circuit closure of the bridge. Thus, the current provided by circuit 10 flows toward terminal 18 and current provided by circuit 11 flows away from terminal 19 as indicated by arrows 41 and 42, respectively, in the drawing. The current through terminal 22 is the algebraic sum of the currents from all activated ones of circuits 10 through 13. In the worst possible condition of unbalance for the illustrated current selection network 43, which includes the previously described diode bridge 24, associated open circuits 10 through 13, and transformer 27, only two of the open circuits would be activated and both with the same output polarity. Consequently, the maximum worst case current that can flow in any branch of the illustrated bridge circuit 24 is only one-half of the total magnitudes of current of any polarity provided by all of the open circuits served by the bridge gate.

It can be seen that gate 24, when used as herein described, is a bidirectional switch. That is, it provides for each circuit served a closure to ground regardless of the direction of current flow in the served circuit. The closure is provided either through a common ground path at terminal 22 of the gate or through another one of the circuits served.

The size of the bias current provided from transformer 27 is governed by the size of the aforementioned worst case maximum bridge current which is the largest current that may flow in the common ground return path from terminal 22. The bias current must be equal to or larger than this maximum worst case ground return path current so that it will not be possible for any combination of currents from activated circuits served by the bridge gate 24 to attain an accumulated magnitude which is sufficient to lock out any other circuit that may also be activated. Increasing the bias current above the minimum required current decreases the voltage drop between terminals 18, 19, 20, or 21 and ground. A bias current margin of about 10 percent over the maximum ground return path current has been advantageously employed.

The number of open circuits which can be served in current selection network 43 is limited by the current-handling capacity of the transistor 26. In the example described the maximum worst case current in the common ground return path is only about half of the total current-producing capacity of all of the circuits 10 through 13 served by the bridge gate 24. This maximum common ground return current must, therefore, with a one-to-one transformer ratio, be somewhat less than the current-handling capacity of transistor 26. However, by arraying a plurality of current selection networks with their transformer 27 primary windings connected in series, additional current selection networks can be controlled by the single transistor 26. This is indicated schematically in FIG. 1 by the additional current selection network 46 and the broken-line connection between networks 43 and 46. Thus, in many memory applications the single transistor 26 can control simultaneously all of the ground return circuit closures for the bit drive circuits of a memory word plane.

One advantage of the multilateral bridge gate 24 described in FIG. 1 is that the circuits 10 through 13 see between ground and their respective intermediate terminals 18 through 21 the impedance of a diode bridge with at least two parallel-connected branches. Although the secondary winding of a transformer 27 is connected across the control diagonal of that bridge, the impedance of this transformer circuit is masked out by the much lower impedance of such a bridge when it is biased for conduction. Consequently, the inductance of the transformer does not actually affect the series impedance of any of the circuits 10 through 13, even though it is included in circuit with the return path closure therefor.

In addition, the bias circuit with its transistor 26, transformer 27, and diodes 28 and 29 is advantageously located at a point which is remote from multilateral bridge 24 without adding extra lead inductance to the impedance of any of the circuits 10 through 13. This latter factor is of some importance in memory applications of the bidirectional switch of the invention because it permits the bias circuit elements to be located away from the memory module. The efficient use of space close to the module involves real problems because of the need for arranging other memory circuit elements therein.

In many systems in which circuits are coupled together for simultaneous operation, there are problems of signal leakage among the circuits. Thus, for example, noise in one of the circuits 10 through 13 might cause current to flow spuriously through bridge 24 in the absence of an applied bridge bias. If such an action takes place it destroys the control exercised by the timing circuit 32. Also, after the noise has ended, the inductive effect of the transformer 27 tends to maintain current flow in a secondary winding loop including the terminals 16, 22, and 17 in a direction to bias the diode bridge into conduction. A later occurring noise in any of the circuits 10 through 13 may produce additional leakage current breakdown and build up the secondary winding loop current to a still higher level. Furthermore, if the bidirectional switch of the invention is employed in connection with a magnetic memory the occurrence of a leakage current at an improper time in one of the circuits 10 through 13 magnetically disturbs any memory magnetic devices coupled to such a circuit. The creation of such a leakage path in association with a memory also shunts down the selected memory circuit and thereby reduces the effectiveness of the memory drive which is thus shunted.

It can be shown in connection with the circuit of FIG. 1 that, as long as the bias current supplied from the secondary winding of transformer 27 is somewhat larger than the maximum net current that can be supplied by the circuits 10 through 13, then the maximum voltage which can be applied across a transfer diagonal of the bridge is less than the voltage drop across one diode in conduction. A transfer diagonal is one of the diagonals including terminal 22, e.g., the diagonal between terminals 20 and 22. In many applications of a bidirectional switch of the type described herein, the circuits 10 through 13 which are served by the switch have a low impedance. The low voltage drop between ground and any one of the intermediate terminals 18 through 21 of a conducting bridge is usually adequate to prevent leakage breakdown of other bridge gate circuits. However, the series diodes 28 and 29 increase the minimum voltage which must be exceeded in order to provide a leakage closure without at the same time significantly adding to the impedance of any individual one of the circuits 10 through 13. It has, thus, been found that, although any two-branch portion of the bridge 24 presents less than a single diode voltage drop during conduction, a total of four diode voltage drops in series, i.e., two bridge diode drops plus the drop through diodes 28 and 29, must be exceeded in order to create a leakage circuit closure.

The bridge gate 24 operates with increasing advantage with respect to reducing leakage disturbance as more bridge branches are added in parallel between the terminals 16 and 17. The reason for this is that, regardless of the number of bridge branches and corresponding circuits served by the bridge gate, the maximum noise voltage that can be applied from the served circuits to the transformer 27 remains the same since such noise voltages are effectively applied in multiple to the transformer. However, the paths available in which a resulting leakage current might flow correspond in number to the total of one less than the total number of branches in the bridge. Consequently, if a leakage breakdown does occur, the resulting current that may flow in any one of the individual circuits 10 through 13 is only a fraction of the total leakage current available. Thus, for example, in a memory application there is a corresponding reduction in the amount of disturbance of the memory by such leakage.

Figure 2:
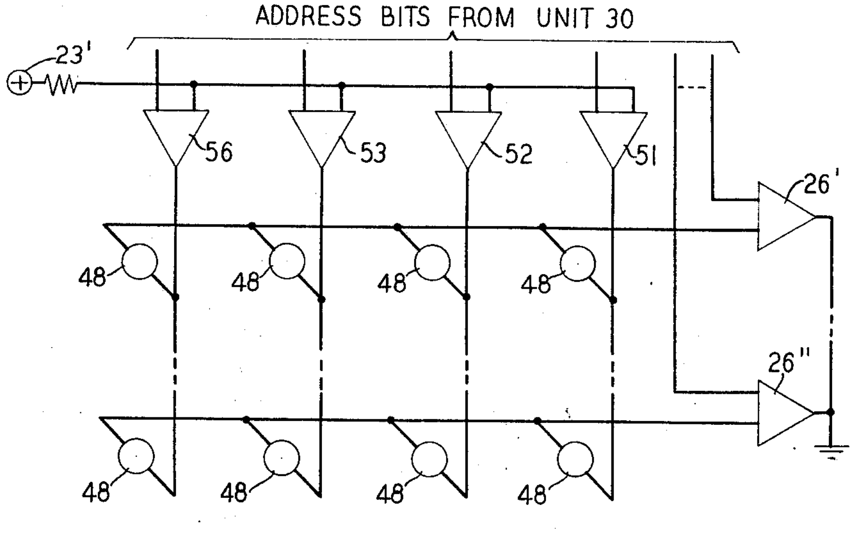
FIG. 2 is a block and line diagram illustrating the manner in which a plurality of circuits in accordance with the invention can be cooperatively combined.

FIG. 2 illustrates one way in which the circuits of FIG. 1 are advantageously arranged in an access switching matrix to facilitate the control of a larger number of current selection networks, such as the networks 43 and 46, with a minimum number of transistors. Each of the crosspoint loads 48 in FIG. 2 is a current control circuit corresponding to those circuit portions of FIG. 1 between the circuit points indicated by the crosses 49 and 50. Amplifiers 26′ and 26″ each correspond to a different transistor 26 of the circuit of FIG. 1 and control a different row connection of the matrix in FIG. 2. Amplifiers 51, 52, 53, and 56 are added to control connections to the columns of the matrix for making current available to a selected crosspoint load of the matrix from the source 23′ which corresponds to the source 23 in FIG. 1. All of the amplifiers 26′, 26″, 51, 52, 53, and 56 receive address information signal bits from the central control unit 30 to cause only one column amplifier and one row amplifier to be enabled for conduction so that current may then flow from source 23′ through the one column amplifier, the one row amplifier, and the corresponding selected crosspoint load 48 to the ground connection at the output of the row amplifiers.

Figure 3:
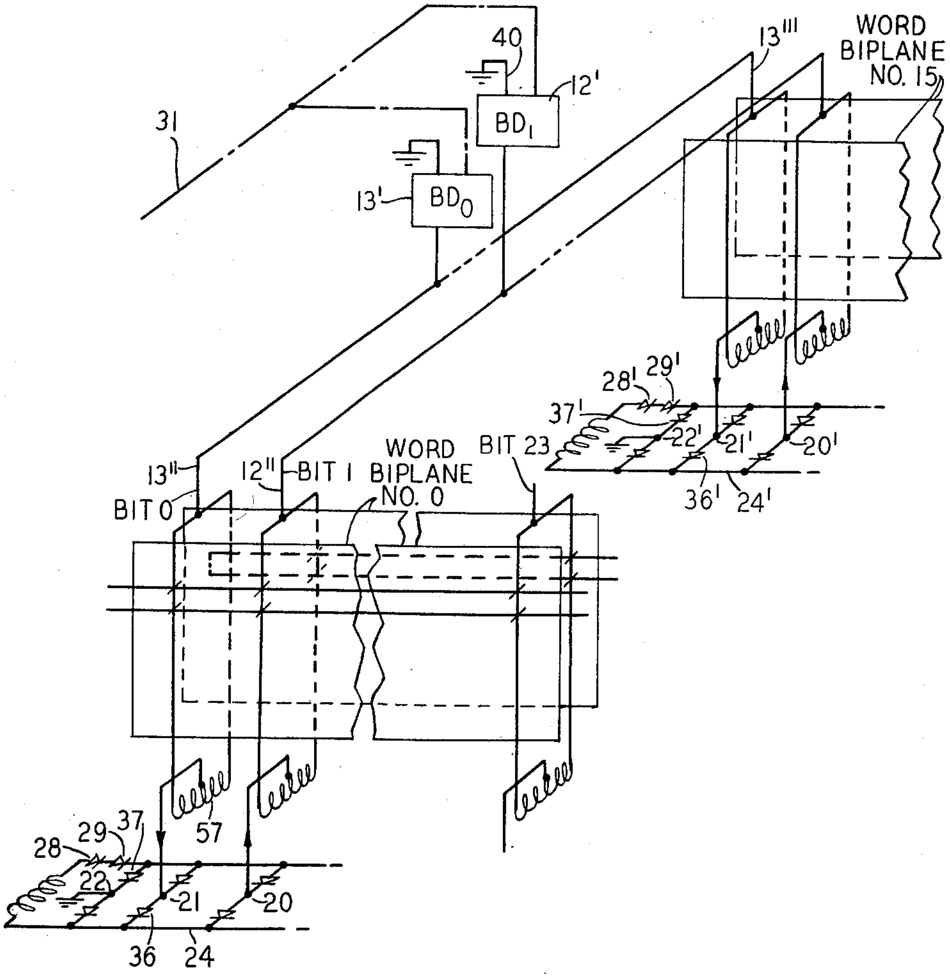
FIG. 3 is an expanded perspective view of a portion of a magnetic memory illustrating one way to employ the invention in connection therewith.

FIG. 3 illustrates relevant parts of a magnetic memory of the type described, for example, in the afore-mentioned Genke-Harding application. Reference characters used in FIG. 3 are the same as or similar to corresponding reference characters for corresponding circuit elements shown in FIG. 1. It is assumed, for purposes of illustration, that the memory of FIG. 3 stores a plurality of 24-bit binary coded words and includes sixteen word biplanes arranged for memory operation on a single-core-per-bit basis. Only the word biplanes No. 0 and No. 15 are shown in FIG. 3. A bit driver $BD_0$, designated driver 13′, in FIG. 3 corresponds to a portion of the open circuit 13 of FIG. 1. A bit 0 circuit 13″ in word biplane No. 0 of FIG. 3 also corresponds to a part of the circuit 13 in FIG. 1.

The two branches of the bit circuit 13″ are connected to opposite terminals of a transformer winding 57 which, in a typical memory of the type described, is provided for read-out coupling to a sensing amplifier, not shown. A center tap on the transformer winding 57 is connected to the intermediate terminal 21 of the bridge gate 24 as is also shown in FIG. 1. When the bit driver 13′ is activated by control unit 30, as described in connection with FIG. 1, it supplies bit current to terminal 21 of the bridge gate 24 at a time when such gate is biased to a conducting condition as also previously described. In a similar manner a bit driver 12′ supplies drive signals in the bit plane $BD_1$ for supplying current to the bridge terminal 20. Each of the bit drivers 12′ and 13′ is similarly connected in multiple to other bit circuits in the same bit planes $BD_1$ and $BD_0$, respectively; and within any such bit plane the individual bit circuits lie in different ones of the word biplanes. All of the other bit planes for the twenty-four bit positions of the memory in FIG. 3 are similarly arranged although connections therefor have not been shown in order to reduce the complexity of the drawing.

The matrix of FIG. 2 is employed for selecting the multilateral bridge gate associated with only the one of the word biplanes in the memory which is to receive bridge bias current. Thus, the bit circuits of only one word biplane are provided with a circuit closure to ground as described in connection with FIG. 1. The bridge gates and bit circuits of all other word biplanes are not selected to receive such bias current. It will be observed, however, that when a bit driver produces an output signal in response to actuation by signals received from the cable 31, a corresponding voltage appears at the corresponding bridge branch intermediate terminal for every bit circuit in the bit plane. Thus, when driver 12′ is activated a corresponding negative-going voltage appears at the bridge branch intermediate terminals 20 and 20′ of bit circuits in word biplanes No. 0 and No. 15, respectively. In like manner, the activation of bit driver 13′ produces positive-going voltages at the bridge branch intermediate terminals 21 and 21′. In each case the voltage at the intermediate bridge branch terminal must be at least adequate to overcome the minimum voltage drop across four diodes in series before bit drive leakage current can flow.

For example, in word biplane No. 15, the drops across diodes 36′, 28′, 29′, and 37′ must be exceeded before bit drive current can flow in the bit circuit 13‴. However, if it is assumed in this example that central control unit 30 of FIG. 1 has operated the matrix of FIG. 2 to select only the word biplane No. 0, bias current is provided to the bridge gate 24 of that biplane; and no bias current is supplied to the bridge gate 24′ of word biplane No. 15. The absence of bias current in the bridge gate 24′ initially favors conduction in the bridge gate 24. Thereafter the maximum voltage difference between the output of the bit driver 13′, for example, and ground is less than the voltage required to maintain conduction in the diodes 36′, 28′, 29′, and 37′ in word biplane No. 15. This is because the latter diodes require a larger applied voltage to maintain conduction than is available across the corresponding conducting diodes in word biplane No. 0. Consequently, the voltage appearing at terminal 21′ is unable to close a leakage current path, and no diversion of the terminal 13′ output current to word biplane No. 15 and away from biplane No. 0 takes place.

Although the present invention has been described in connection with a particular embodiment thereof and the application of that embodiment to a particular system utilization, additional embodiments, applications, and modifications which will be obvious to those skilled in the art are included within the spirit and scope of the invention.

What is claimed is:

1. In combination, first and second terminals, a plurality $n$ of pairs of diodes, the diodes of each pair being connected with an intermediate terminal in a different series circuit between said terminals, said diodes being poled for conduction in the same direction between said first and second terminals, means connected to said first and second terminals for biasing all of said diodes for conduction at the same time, and $n-1$ open circuits each having a first terminal connected to said intermediate terminal of a different one of $n-1$ of said series circuits and each of said open circuits also having a second terminal coupled to said intermediate terminal of the same $n$th one of said series circuits.

2. The combination in accordance with claim 1 in which:

each of said series circuits includes only passive circuit elements.

3. The combination in accordance with claim 1 in which:

said biasing means supplies current to said diodes, each of said open circuits includes a different source of current, and the total of the magnitudes of currents from all of said sources is greater than the magnitude of the current from said biasing means.

4. The combination in accordance with claim 3 which comprises in addition:

means controlling said sources to cause any one or more to be simultaneously operative.

5. The combination in accordance with claim 1 in which:

each of said open circuits includes a different current source, a first portion of said sources is poled in one direction with respect to said intermediate terminal of said $n$th series circuit, and a second portion of said sources is poled in the opposite direction with respect to said intermediate terminal of said $n$th series circuit.

6. The combination in accordance with claim 5 in which:

said biasing means supplies current to said diodes, and the current from said biasing means is at least equal in magnitude to the maximum sum of currents of a given polarity from said sources.

7. The combination in accordance with claim 5 in which:

at least one of said open circuits including a source of one polarity provides a further return circuit closure for another one of said open circuits which includes a source having opposite polarity, such further return circuit closure including said first and second terminals and thereby reducing current in said $n$th series circuit intermediate terminal to the algebraic sum of all open circuit currents.

8. In combination, a plurality of open circuits, bias current responsive bidirectional switching means connected to complete all of said circuits by providing an electrical closure therefor, and means simultaneously controlling said switching means for all of said circuits, said controlling means comprising a transformer and additional means cooperating with said transformer coupling bias current to actuate said switch means and thereby provide a simultaneous closure for all of said open circuits.

9. The combination in accordance with claim 8 in which:

said transformer includes primary and secondary windings and said secondary winding is coupled to said switching means, and said coupling means includes a transistor connected in series with said primary winding to control the conductivity of the series combination of said primary winding and said transistor.

10. The combination in accordance with claim 9 which comprises in addition:

an operating potential source connected in said coupling means across said series combination, and means supplying pulses to said transistor for biasing said transistor into conduction and thereby actuating said switching means.

11. The combination in accordance with claim 9 which comprises in addition:

asymmetrically conducting impedance means connected in series between said secondary winding and said switching means.

12. The combination in accordance with claim 9 in which:

said transformer, said switching means, and said plural open circuits comprise a current selection network, at least one additional current selection network is provided and is similar to the first mentioned current selection network, and each of said transformers includes a primary winding and all of said primary windings are connected in series in said series combination.

13. The combination in accordance with claim 12 in which:

said first mentioned and additional current selection networks and said transistor comprise a current control circuit, a plurality of additional similar current control circuits are provided, said current control circuits being divided into plural groups of plural current control circuits in which each said series combination has first and second circuit junctions at opposite ends of the series connection of said primary windings, means in each of said groups connect said first junctions of all of said series combinations of such group together, means connect said second junctions of corresponding series combination circuits of each of said groups together, and means apply a source of operating potential to said first junction of one of said groups and to one of said second junctions of a series combination of the same group.

14. The combination in accordance with claim 13 in which:

potential difference across an actuated switching means in one of said current control circuits is less than the potential difference normally required to initiate conduction of said switching means and its asymmetrically conducting impedance means in a different one of said current control circuits.

15. The combination in accordance with claim 1 in which:

said biasing means comprises a common current path for all of said $n-1$ circuits between said terminals.

16. The combination in accordance with claim 1 in which:

the impedance presented by said diodes to each of said $n-1$ circuits is much less than the impedance of said biasing means between said first and second terminals.

17. The combination in accordance with claim 5 in which:

said biasing means includes switch means for turning said biasing means off and on, and said switch means has a current conducting capability which is less than the total output of all of said current sources but at least as great as the total output of the sources of one of said portions.

18. The combination in accordance with claim 8 in which:

said transformer has a secondary winding connected to supply said bias current to said switching means and to conduct signal current from all of said open circuits as a part of said closure, and said bias current is large enough to hold all of said switching means actuated in the presence of said signal current.

19. The combination in accordance with claim 9 in which:

said transistor has a current handling capacity at least equal to said bias current but less than the total signal current magnitude handled by all of said open circuits.

20. The combination in accordance with claim 11 in which:

said switching means comprises a plurality $n$ of pairs of diodes, the diodes in each pair being connected with an intermediate terminal in a different series circuit between said terminals, said diodes being poled for conduction in the same direction between said first and second terminals, said open circuits each have a first terminal connected to said intermediate terminal of a different one of said series circuits and a second terminal connected to said intermediate terminal of the same $n$th one of said series circuits, at least a portion of said open circuits including respective signal sources, said transformer applies said bias current through said impedance means to all of said series circuits in parallel for providing said closure, and said bias current is of sufficient magnitude to maintain all of said diodes in conduction in the presence of signals from said sources.

References Cited

UNITED STATES PATENTS

| | | | |
|---|---|---|---|
| 3,056,040 | 9/1962 | Markowitz | 307—88 |
| 3,059,125 | 10/1962 | Wiancko et al. | |
| 3,093,813 | 6/1963 | Gerbig. | |
| 3,096,446 | 7/1963 | Cohen. | |
| 3,021,607 | 8/1965 | Richer. | |

OTHER REFERENCES

IBM Technical Disclosure Bulletin, Matrix Switch, G. D. Bruce et al., vol. 6, No. 12, May 1964, p. 68 (340-166C).

DONALD J. YUSKO, Primary Examiner